(12) United States Patent
Xing et al.

(10) Patent No.: US 9,711,914 B2
(45) Date of Patent: Jul. 18, 2017

(54) CABLE CONNECTOR ASSEMBLY HAVING A STOPPING MEMBER FOR AVOIDING LIGHT SCATTERING

(71) Applicant: FOXCONN INTERCONNECT TECHNOLOGY LIMITED, Grand Cayman (KY)

(72) Inventors: Da-Wei Xing, Kunshan (CN); Jun Chen, Kunshan (CN); Jerry Wu, Irvine, CA (US); Jia-Chao Yan, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/246,833

(22) Filed: Aug. 25, 2016

(65) Prior Publication Data
US 2017/0062997 A1    Mar. 2, 2017

(30) Foreign Application Priority Data

Aug. 25, 2015  (CN) .......................... 2015 1 0525046

(51) Int. Cl.
*H01R 3/00*    (2006.01)
*H01R 13/717*  (2006.01)
*F21V 8/00*    (2006.01)
*H01R 12/71*   (2011.01)

(52) U.S. Cl.
CPC ....... *H01R 13/7175* (2013.01); *G02B 6/0001* (2013.01); *H01R 12/712* (2013.01)

(58) Field of Classification Search
CPC ................................................ H01R 13/7175

USPC .................................................. 439/490, 76.1
See application file for complete search history.

(56) References Cited

U.S. PATENT DOCUMENTS

| 6,572,402 B2* | 6/2003 | Lin ........................ H01R 24/58 439/490 |
| 7,168,975 B2* | 1/2007 | Kuo ................... H01R 13/6658 439/490 |
| 7,677,916 B2* | 3/2010 | Chang ................... H01R 4/029 439/490 |
| 7,789,675 B2 | 9/2010 | Zhang et al. |
| 7,841,892 B2* | 11/2010 | Zhou ................... H01R 13/5845 439/455 |

\* cited by examiner

*Primary Examiner* — Neil Abrams
(74) *Attorney, Agent, or Firm* — Wei Te Chung; Ming Chieh Chang

(57) ABSTRACT

A cable connector assembly includes a cable and an electrical connector electrically connected with the cable, and the electrical connector includes a mating member, a printed circuit board electrically connected with the mating member, a light emitting element electrically connected with the printed circuit board and a light guide element for transmitting the light emitted by the light emitting element, having a receiving room, wherein the light emitting element is received in the receiving room, and the printed circuit board includes a soldering portion electrically connected with the matting member and an extension portion rearwardly extending from the soldering portion, and the cable connector assembly further includes a stopping member disposed between the soldering portion and the light guide element and abutting against the light guide element, to block the receiving room of the light guide element.

20 Claims, 6 Drawing Sheets

CABLE CONNECTOR ASSEMBLY HAVING A STOPPING MEMBER FOR AVOIDING LIGHT SCATTERING

BACKGROUND OF THE INVENTION

1. Field of the Invention

The present invention relates generally to a cable connector assembly and more particularly to a cable connector assembly having light emitting element and a stopping member for avoiding light scattering of the light emitting element.

2. Description of Related Arts

U.S. Pat. No. 7,789,675, issued on Sep. 7, 2010, shows a cable connector assembly including a mating member, an internal printed circuit board, a light emitting element on the printed circuit board, a light guide, and a cable. The light guide includes a cylindrical tubular portion enclosing the cable. The cable has a portion extending though a side of the printed circuit board to connect with a conductor of the mating member.

An improved cable connector assembly is desired.

SUMMARY OF THE INVENTION

An object of the present invention is to provide an improved cable connector assembly.

To achieve the above-mentioned object, a cable connector assembly includes a cable and an electrical connector electrically connected with the cable, and the electrical connector includes a mating member, a printed circuit board electrically connected with the mating member, a light emitting element electrically connected with the printed circuit board and a light guide element for transmitting the light emitted by the light emitting element, having a receiving room, wherein the light emitting element is received in the receiving room, and the printed circuit board includes a soldering portion electrically connected with the matting member and an extension portion rearwardly extending from the soldering portion, and the cable connector assembly further includes a stopping member disposed between the soldering portion and the light guide element and abutting against the light guide element, to block the receiving room of the light guide element.

DETAILED DESCRIPTION OF THE PREFERRED EMBODIMENT

Figure 1:
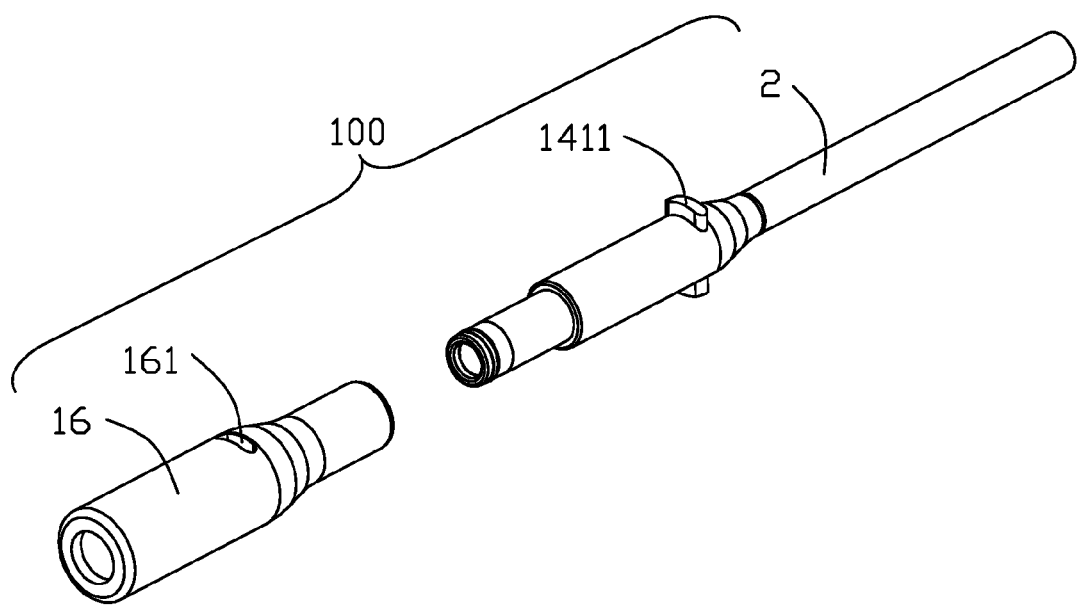
FIG. 1 is a partially exploded view of a cable connector assembly in accordance with the present invention.
Figure 2:
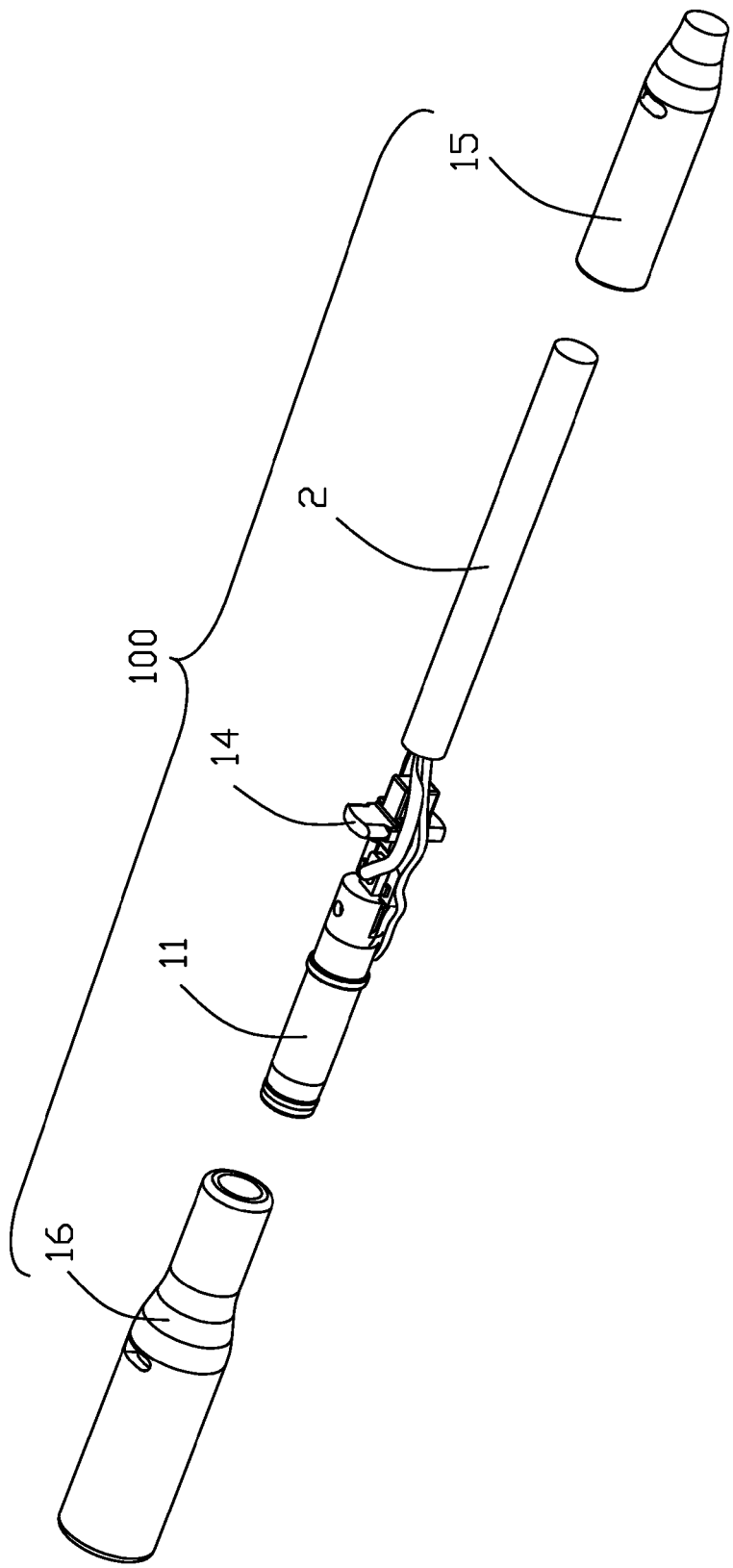
FIG. 2 is a further partially exploded view of the cable connector assembly.
Figure 3:
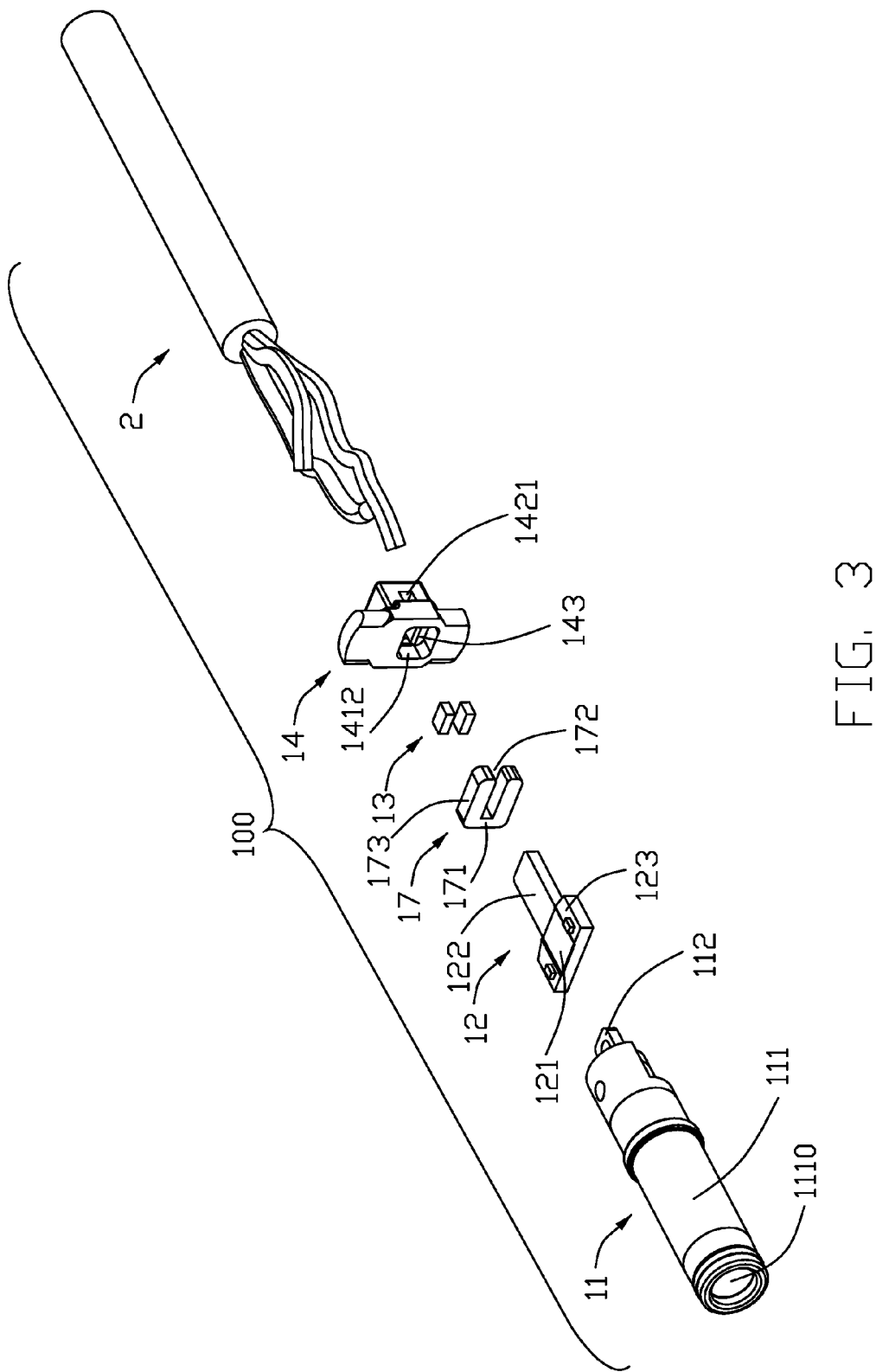
FIG. 3 is another exploded view of the cable connector assembly shown in FIG. 1.
Figure 4:
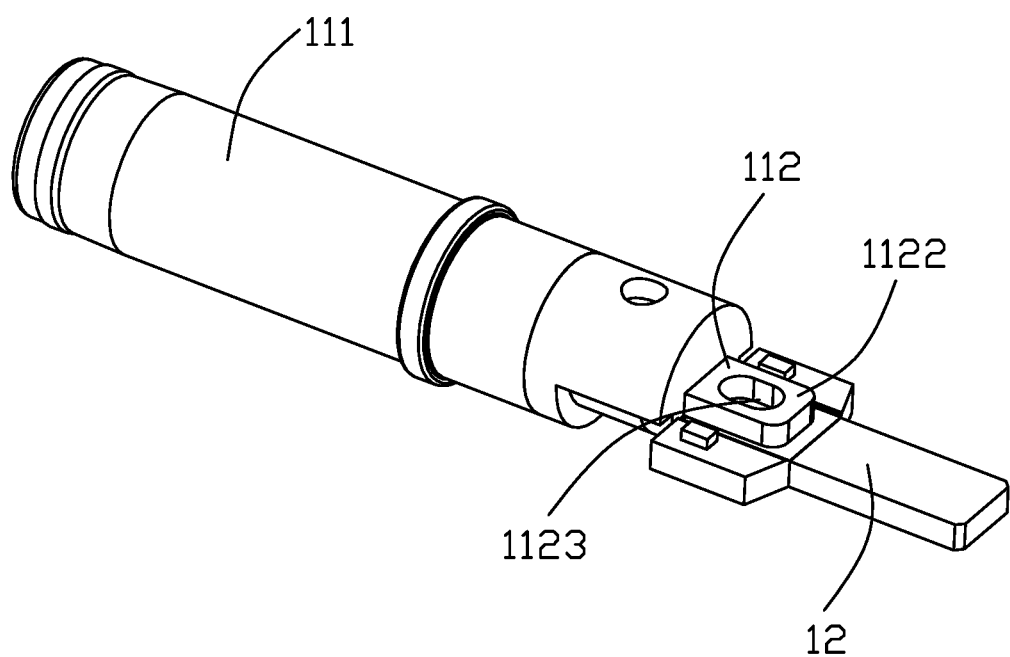
FIG. 4 is a perspective view of the assembled structure of a mating member and a printed circuit board of the cable connector assembly.
Figure 5:
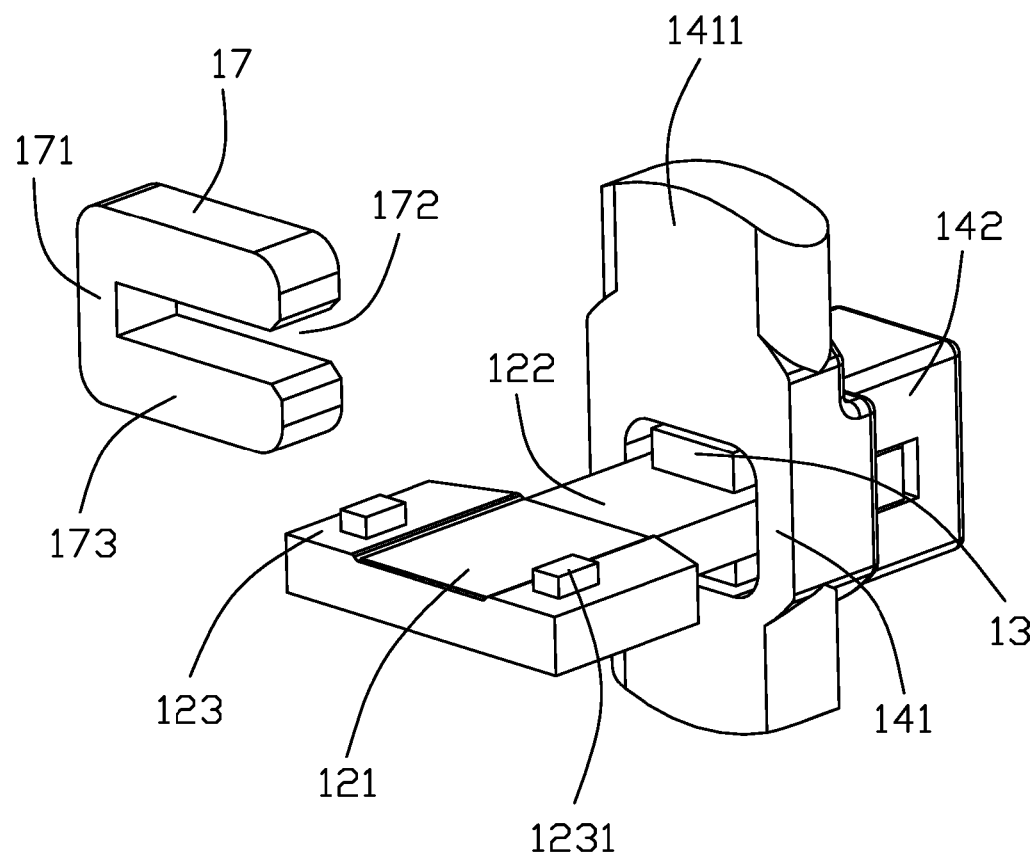
FIG. 5 is a perspective view of parts of the cable connector assembly, wherein a stopping member and the printed circuit board are disassembled.
Figure 6:
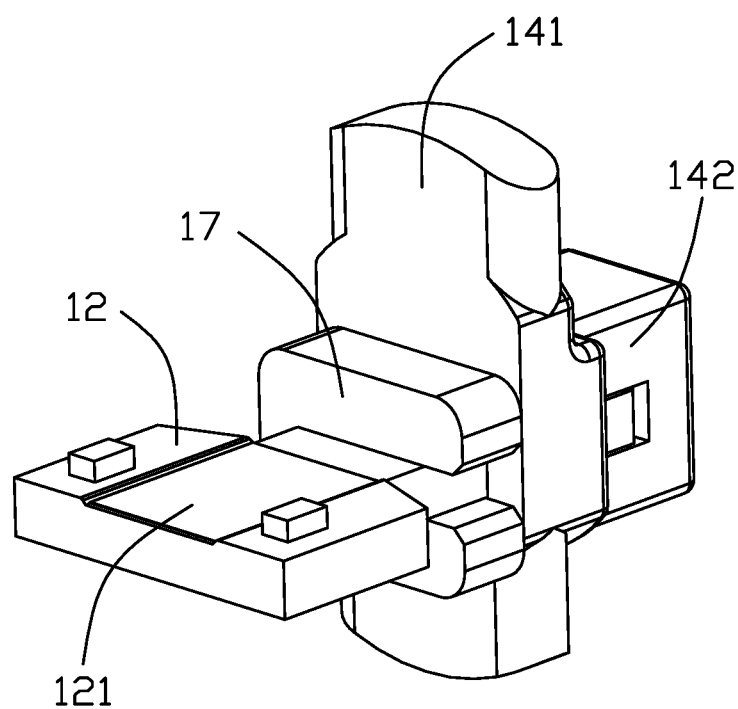
FIG. 6 is a perspective view similar to FIG. 6, wherein the stopping member and the printed circuit board are assembled.

Referring to FIGS. 1 to 7, a cable connector assembly in accordance with the present invention for mating with a mating connector (not shown), comprises an electrical connector 1 and a cable 2 electrically connected with the electrical connector 1. The electrical connector 1 includes s mating member 11, a printed circuit board 12 electrically connected with the mating member 11, a light emitting element 13 electrically connected with the printed circuit board 11, a light guide element 14 for transmitting the light emitted by the light emitting element 13, an insulative inner mold 15 enclosing the printed circuit board 12 and the mating member 11, and an outer case 16 enclosing the inner mold 15 and a front end of the cable 2.

The mating member 11 includes a hollow cylindrical tubular portion 111 and a center contact 112 received in the tubular portion 111. The tubular portion 111 defines a receiving room 1110. The center contact 112 includes a mating portion (not shown) received in the receiving room 1110, and a connecting portion 1122 rearwardly extending from the mating portion and exposing to the tubular portion 111. The connecting portion 1122 defines a plurality of through holes 1123 for receiving solder.

The printed circuit board 12 disposed in the cable connector assembly 100 along a axial direction, including a soldering portion 121 electrically connected with the connecting portion 1122 of the center contact 112, an extension portion 122 rearwardly extending from the soldering portion 121 and a pair of wing portions 123 from two opposite sides of the soldering portion 121 respectively. In the present embodiment, at least a partially portion of the soldering portion 121 of the printed circuit board 12 is recessed by milling out process, that is to say, the height of the soldering portion 121 of the printed circuit board 12 in the vertical direction is smaller than the height of the wing portions 123 in the vertical direction. The height of the soldering portion 121 is less than the height wing portion 123 0.1 mm. As the mating member 11 of the cable connector assembly 100 into a cylindrical shape, the size of the assembly has certain requirements. When the connecting portion 1122 of the center contact 112 is soldered on the soldering portion 121 of the printed circuit board 12, the recessing area of the printed circuit board 12 can remind the operator the welding region, preventing the connecting portion 1122 of the center contact 112 having a larger deflection in a left-to-right direction when soldering, bring less assembly error, thus avoiding the impact of the assembling of the inner mold 15 and the outer case 16. Each of the wing portions 123 sets an electronic component 1231. The width of the center contact 112 in the left-to-right direction is not more than the width of the soldering portion 121 in the left-to-right direction. The gap between the center contact 112 and the two wing portions 123 in the left-to-right direction is 0.05mm, preventing excess solder overflowing and reaching on the wing portions 123 to make electronic components 1231 failure.

The light guide element 14 is defined on a side closing to the cable 2, including a vertical portion 141 extending along a vertical direction and vertically defined on the printed circuit board 12, and a projecting portion 142 rearwardly extending from the vertical portion 141. The vertical portion 141 defines a light-transmissive region 1411 for the user to observe the state of the light emitting element 13 and a receiving room 1412 rearwardly recessing on a side closing to the printed circuit board 12. The pair of light emitting element 13 and the vertical portion 141 is located in a same vertical plane in order to better light output. The projecting portion 142 defines a receiving slot 1421 for receiving the extension portion 122 of the printed circuit board 12, the height of which in the vertical direction is smaller than the height of the receiving slot 1421 in the vertical direction.

The receiving slot 1421 is communication with the receiving room 1412 and forms a stepping portion 143 for abutting against the light emitting element 13. In the present embodiment, the projecting portion 142 and the vertical portion 141 are integral, in other embodiment, the projecting portion 142 and the vertical portion 141 may be configured to split, the projecting portion 142 being assembled on a rear end of the vertical portion 141.

The cable connector assembly 100 further includes a stopping member 17 located between the soldering portion 121 of the printed circuit board 12 and abutting on the light guide element 14 to blocking the receiving room 1412. The stopping member 17 is of U-shaped and recessed extending along a left-to-right direction, including a fixing portion 171 abutting the extension portion 122 of the printed circuit board 12 and a groove 172 facing the fixing portion 171. The groove 172 is formed between a pair of columnar portion 173. The printed circuit board 12 is held in the groove 12 in the left-to-right direction. The width of the stopping member 17 in the left-to-right direction is substantially the same with the width of the vertical portion 141 of the light guide element 14 in the left-to-right. The width of the stopping member 14 in an up-to-down direction is not less than the width of the receiving room 1412 in the up-to-down direction.

The light emitting element 13 including a pair, electrically connected to the extension portion 122 of the printed circuit board 12. The printed circuit board 12 including a top surface 124 and an opposite bottom surface 125, and one of the light emitting elements 13 is disposed on the top surface 124, and another is disposed on the bottom surface 125. In the present embodiment, the light emitting elements 13 are LED lights, both of which are soldered on the printed circuit board 12 by SMT.

The inner mold 15 encloses the mating member 11 and the printed circuit board 12 by insert molding. The outer case 16 encloses the inner mold 15 and a part of the cable 2 by over molding. A part of the light-transmissive region 1411 of the light guide element 14 exposes to the inner mold 15. The outer case 16 defines a through hole 161 to expose the light-transmissive region 1411 of the light guide element 14. The light emitting element 13 can presents different display states according to the working state of the cable connector assembly 100.

When the cable connector assembly is assembled, the connecting portion 1122 of the center contact 112 is soldered on the soldering portion 121 of the printed circuit board 12. The extension portion 122 of the printed circuit board 12 is inserted into the receiving slot 1421 along a front-to-back direction, which receives the light guide element 14. The light emitting element 13 soldered on the printed circuit board 12 rearwardly bears against the stepping portion 143. The stopping member 17 rearwardly bears against the vertical portion 141 of the light guide element 14, to blocking the receiving slot 1412 of the light guide element 14. The cable 2 is electrically connected with the mating member 11. The inner mold 15 encloses the matting member 11 and the printed circuit boards 12 by insert molding. The outer case 16 encloses the inner mold 15 and the part of the cable 2 by over molding.

The stopping member 17 according to the present invention avoids the plastic entering the light guide element 14 by the receiving slot 1412, when the inner mold 15 is insert molded, avoiding the influence of translucent products. The soldering portion 121 is recessed downwardly on the printed circuit board 12, to remind the operator to solder the center contact 112 on the recessed region, avoiding having a larger position-skewed of the center contact 112 when the center contact 112 is soldered on the printed circuit board 12, because of which, the assembling of the outer case 16 is reflected.

What is claimed is:

1. A cable connector assembly comprising:
   a cable;
   an electrical connector electrically connected with the cable and comprising:
      a mating member;
      a printed circuit board electrically connected with the mating member;
      a light emitting element electrically connected with the printed circuit board; and
      a light guide element for transmitting the light emitted by the light emitting element, light guide element having a receiving room; wherein
   the light emitting element is received in the receiving room, and the printed circuit board includes a soldering portion electrically connected with the mating member and an extension portion rearwardly extending from the soldering portion; and
   a stopping member disposed between the soldering portion and the light guide element, the stopping member abutting against the light guide element to block the receiving room of the light guide element.

2. The cable connector assembly as claimed in claim 1, wherein the stopping member is U-shaped and includes a fixing portion abutting against the extension portion of the printed circuit board, a pair of columnar portions, and a groove facing the fixing portion.

3. The cable connector assembly as claimed in claim 2, wherein the light guide element includes a vertical portion perpendicular to the printed circuit board and extending along an up-to-down direction and a projecting portion rearwardly extending from the vertical portion, the extension portion defines a receiving slot for receiving the extension portion of the printed circuit board, the width of the receiving slot in the up-to-down direction is smaller than the width of the receiving room in the up-to-down direction, the receiving room is communicated with the receiving slot, and a stepping portion is formed between the receiving room and the receiving slot.

4. The cable connector assembly as claimed in claim 3, wherein the width of the stopping member in a left-to-right direction is substantially the same as the width of the vertical portion of the light guide element in the left-to-right direction.

5. The cable connector assembly as claimed in claim 3, wherein the width of the stopping member in the up-to-down direction is greater than the width of the receiving room in the up-to-down direction.

6. The cable connector assembly as claimed in claim 3, wherein the printed circuit board includes a pair of wing portions extending from two opposite sides of the soldering portion, and the width of the soldering portion in the up-to-down direction is smaller than the width of the wing portions in the up-to-down direction.

7. The cable connector assembly as claimed in claim 2, wherein the mating member includes a center contact soldered on the soldering portion of the printed circuit board, and the width of the center contact in left-to-right direction is less than the width of the soldering portion in left-to-right.

8. The cable connector assembly as claimed in claim 1, wherein the printed circuit board includes a top surface and a bottom surface, and the light emitting element is disposed on both the top surface and the bottom surface.

9. The cable connector assembly as claimed in claim 1, wherein the vertical portion of the light guide element defines a light transmission area for displaying a status of the light emitting element.

10. The cable connector assembly as claimed in claim 9, further comprising an outer case enclosing the inner mold and a part of the cable.

11. A cable connector assembly comprising:
a printed circuit board defining opposite front and rear regions along a front-to-back direction;
a light emitting element mounted upon the rear region of the printed circuit board;
a light guiding element surrounding said rear region enclosing both the rear region of the printed circuit board and the light emitting element;
a mating member connected to the front region of the printed circuit board;
a cable extending behind the printed circuit board and equipped with a plurality of wires extending forwardly to pass beside the light guiding element with front ends mechanically and electrically connected to printed circuit board;
a stopping member mounted upon the printed circuit board and rearwardly abutting against the light guiding element;
an inner mold overmolded upon a front portion of the cable, the printed circuit board with the light guiding element thereon, and a rear portion of the mating member; and
a light transmissive region extends through the inner mold to be exposed to an exterior transversely perpendicular to said front-to-back direction; wherein
the stopping member prevents the inner mold from invading an interior of the light guiding element during molding so as to assuring no light derived from the light emitting element is blocked.

12. The cable connector assembly as claimed in claim 11, wherein the light guiding element forms a receiving room with a front opening to allow the rear region of the printed circuit board with the light emitting element thereon to be inserted thereinto.

13. The cable connector assembly as claimed in claim 12, wherein a rear side of said receiving room is sealed by the light guiding element for assuring no light escapes therefrom.

14. The cable connector assembly as claimed in claim 11, wherein said stopping member forms a U-shaped configuration so as to be assembled to the printed circuit board sidewardly and receive the printed circuit board in a slot of said U-shaped configuration.

15. The cable connector assembly as claimed in claim 11, wherein said light guiding element forms a step structure forwardly confronting the light emitting element.

16. The cable connector assembly as claimed in claim 11, further including an outer case enclosing the inner mold and a front portion of the mating member, and the light transmissive region extends through the outer case to be transversely exposed to the exterior.

17. A cable connector assembly comprising:
a printed circuit board defining opposite front and rear regions along a front-to-back direction;
a light emitting element mounted upon the rear region of the printed circuit board;
a light guiding element surrounding said rear region enclosing both the rear region of the printed circuit board and the light emitting element;
a mating member connected to the front region of the printed circuit board;
a cable extending behind the printed circuit board and equipped with a plurality of wires extending forwardly to pass beside the light guiding element with front ends mechanically and electrically connected to printed circuit board;
a stopping member mounted upon the printed circuit board and rearwardly abutting against the light guiding element;
an inner mold overmolded upon the printed circuit board with the light guiding element thereon; and
a light transmissive region extends through the inner mold to be exposed to an exterior transversely perpendicular to said front-to-back direction; wherein
the stopping member prevents the inner mold from invading an interior of the light guiding element during molding so as to assuring no light derived from the light emitting element is blocked; wherein
said mating member is soldered to the front region of the printed circuit board.

18. The cable connector assembly as claimed in claim 17, wherein said inner mold is further overmolded upon a front portion of the cable and a rear portion of the mating member.

19. The cable connector assembly as claimed in claim 17, wherein said light emitting element is fully circumferentially surrounded by all the printed circuit board, the light guiding element and the stopping member.

20. The cable connector assembly as claimed in claim 17, wherein said light guiding element forms a receiving room to receive the light emitting element and the rear region of the printed circuit board.

* * * * *